United States Patent
Lövsén et al.

(10) Patent No.: US 8,675,843 B2
(45) Date of Patent: Mar. 18, 2014

(54) CHARGING DATA RECORD GENERATING NODE

(75) Inventors: Lars Gunnar Lövsén, Göteborg (SE); Fredrik Garneij, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 65 days.

(21) Appl. No.: 13/576,784

(22) PCT Filed: Dec. 29, 2010

(86) PCT No.: PCT/EP2010/070884
§ 371 (c)(1),
(2), (4) Date: Aug. 2, 2012

(87) PCT Pub. No.: WO2011/101065
PCT Pub. Date: Aug. 25, 2011

(65) Prior Publication Data
US 2012/0302208 A1    Nov. 29, 2012

Related U.S. Application Data

(60) Provisional application No. 61/306,119, filed on Feb. 19, 2010.

(51) Int. Cl.
*H04M 15/00* (2006.01)
*H04M 11/00* (2006.01)
*H04W 4/00* (2009.01)

(52) U.S. Cl.
USPC .... 379/126; 379/121.05; 455/408; 455/432.1

(58) Field of Classification Search
USPC ................ 379/111, 112.01, 114.01, 121.01, 379/121.04, 121.05, 126; 455/406, 408, 455/432.1, 432.2, 433
See application file for complete search history.

(56) References Cited

U.S. PATENT DOCUMENTS

| | | | | |
|---|---|---|---|---|
| 7,844,250 | B2 * | 11/2010 | Olsson et al. ................. | 455/408 |
| 2006/0004643 | A1 * | 1/2006 | Stadelmann et al. ........... | 705/34 |

(Continued)

FOREIGN PATENT DOCUMENTS

EP    1748662 A1    1/2007

OTHER PUBLICATIONS

Universal Mobile Telecommunications Systems (UMTS): Telecommunication Management; Charging Management; Charging data description for the packet switched (PS) domain (3GPP TS 32.215 Version 5.9.0 Release 5); ETSI TS 132 215", ETSI Standards, LIS, Sophia Antipolis Cedex, France, vol. 3-SA5, No. V5.9.0; Jun. 1, 2005, XP014030705, ISSN; 0000:0001 consisting of 69-pages.

(Continued)

*Primary Examiner* — Binh Tieu
(74) *Attorney, Agent, or Firm* — Christopher & Weisberg, P.A.

(57) ABSTRACT

1. A Charging Data Record, CDR, generating node (110) for a cellular access system (100), the CDR generating node (110) being characterized in that it is arranged to generate CDRs for Internet Protocol version 6, IPv6, traffic in the CDR format for IPv4 traffic instead of in the CDR format for Iv6 traffic, the Charging Data Record generating node being arranged to generate IPv4 CDRs for IPv6 traffic instead of IPv6 CDRs by means of changing the Information Element "pdpType" or the Information Element "pdpPDNType" from F157H to F121H, and by means of changing the Information Element "served PDPaddress" or the Information Element "served PDPPDN Address" from an IPv6 format to an IPv4 format

20 Claims, 1 Drawing Sheet

(56) References Cited

U.S. PATENT DOCUMENTS

2007/0162289 A1* 7/2007 Olsson et al. ............... 705/1
2010/0150046 A1* 6/2010 Li et al. .................... 370/311
2010/0318448 A1* 12/2010 Li et al. .................... 705/30

OTHER PUBLICATIONS

International Search Report and Written Opinion dated Jun. 14, 2011 for International Application Serial No. PCT/EP2010/070884; International Filing Date: Dec. 29, 2010 consisting of 9-pages.

* cited by examiner

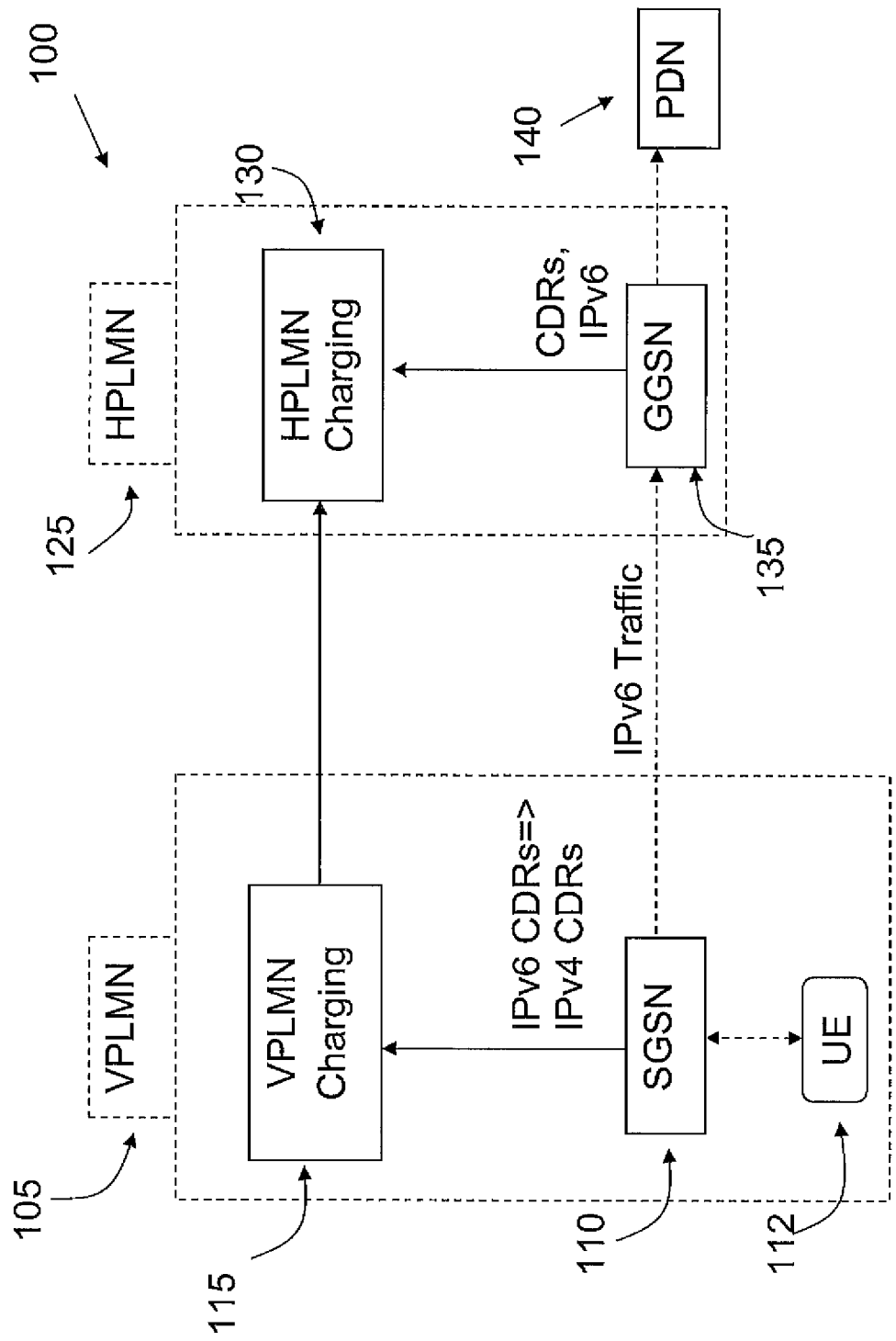

CHARGING DATA RECORD GENERATING NODE

CROSS-REFERENCE TO RELATED APPLICATIONS

This application is a Submission Under 35 U.S.C. §371 for U.S. National Stage Patent Application of International Application Number: PCT/EP2010/070884, filed Dec. 29, 2010 entitled "A CHARGING DATA RECORD GENERATING NODE," which claims priority to U.S. Provisional Application Ser. No: 61/306,119, filed Feb. 19, 2010, the entirety of which is incorporated herein by reference.

TECHNICAL FIELD

The present invention discloses a Charging Data Record node for a cellular access system, with translation capacity for Charging Data Records between different formats.

BACKGROUND

In the case of charging of traffic from user terminals, and in particular in the case of charging of traffic from Packet Switched, PS, data mobile terminals which are roaming in a Visited Public Land Mobile Network, a VPLMN, the traffic either passes the Home Public Land Mobile Network, the HPLMN, or the Home Operator relies on the Visited Operator to generate the Charging Data Records, the CDRs, to be used by the Home Operator for billing. The Visited Network generates a traffic counting record comprising the traffic counting information from the Visited Network. The traffic counting record is subsequently sent to the Home Network.

In present 3GPP mobile Packet Switched networks, it is possible to use both Internet Protocol version 4, IPv4, and version 6, IPv6, to carry packets containing user traffic.

Besides obtaining PS access service in an operator's Home network, it is also possible establish a connection to the Home Operator using a Visited Operator's access network, i.e. roaming. To settle the costs for roaming users between the Home Operator and the Visited Operator, information on transport usage is sent from the Visited Operator to the Home network by means of billing records also known as Charging Data Records, CDRs. The 3GPP specification TS 32.298 describes the format of the CDRs. Depending on which IP version traffic that is used, the CDRs differ in Information Elements, IEs, for example IEs which state the servedPDPAddress/servedPDPPDNAddress and pdpType/pdpPDNType Roaming users are billed by the Home operator. When a PS data user is roaming, the SGSN/SGW (Serving Gateway) in the VPLMN will perform traffic measurements and count the amount of traffic that is handled. The traffic reports are sent to the Home Operator as CDRs, or so called TAP (Transferred Account Procedure) records which are derived from the CDRs, for accounting between the operators. In a solution in which the traffic also passes the HPLMN via a GGSN or a Packet Data Gateway, a PGW, in the Home Operator's network, the Home Operator generates his own CDRs, and there is a double check in the Home Operator's GGSN/PGW that the traffic charges that the Visited Operator claims from the Home Operator (and also the billing of the user) are correct.

In the case of a roaming user who uses IPv6 traffic in a VPLMN, the CDR generating node in the VPLMN will generate CDRs according to the CDR format for IPv6 traffic. The billing system in the VPLMN which receives such IPv6 CDRs from the CDR generating node in the VPLMN is capable of handling IPv4 CDRs, but may not be able to handle IPv6 CDRs. In such a case, when the VPLMNs billing system receives CDRs it does not recognize, in this case IPv6 CDRs, those CDRs cannot be handled within the billing system, and thus the traffic volume represented by those CDRs cannot be billed, and the revenue will be lost unless handled manually.

SUMMARY

It is an object of the present invention to address the issue of CDRs which are generated by a CDR generating node in a visited system in a format which is incompatible with the format of CDRs in the billing system of the Visited Operator. In more detail, the formats which are deal with here are CDRs of the IPv4 and IPv6 formats, where IPv4 CDRs are used by the visited operator and IPv6 CDRs are used by the home operator.

This object is addressed by the present invention in that it discloses a Charging Data Record, CDR, generating node for a cellular access system which is arranged to generate CDRs for Internet Protocol version 6, IPv6, traffic in the CDR format for IPv4 traffic instead of in the CDR format for IPv6 traffic.

The CDR generating node is arranged to generate IPv4 CDRs for IPv6 traffic instead of IPv6 CDRs by means of changing the Information Element "pdpType" or the Information Element "pdpPDNType" from F157'H to F121'H, and by means of changing the Information Element "servedPDPaddress" or the Information Element "servedPDPPDNAddress" from an IPv6 format to an IPv4 format.

In some embodiments, the Charging Data Record generating node is arranged to change the Information Element "servedPDPaddress" from an IPv6 format to an IPv4 format by means of changing it from the Charging Data Record's IPv6 address to the IPv4 address 0.0.0.0.

In some embodiments, the Charging Data Record generating node is arranged to change the Information Element "servedPDPaddress" from an IPv6 format to an IPv4 format by means of copying selected bits from the IPv6 address to the IPv4 address which is to be used. In some such embodiments, the Charging Data Record generating node is arranged to copy the lower 32 bit of the 64 bit IPv6 prefix assigned to the MS/UE into the IPv4 "servedPDPaddress" or "servedPDPPDNAddress" which is to be used. In some such embodiments, the Charging Data Record generating node is arranged to label the generated IPv4 address by replacing certain predefined bits with other predefined bits, in order to indicate that a change of an Information Element of the type PDPType has taken place in the Charging Data Record.

In some embodiments, the Charging Data Record generating node is arranged to first generate an IPv6 Charging Data Record, and to then alter the IPv6 Charging Data Record into an IPv4 Charging Data Record.

In some embodiments, the Charging Data Record generating node is arranged to generate an IPv4 Charging Data Record by means of generating it directly from the data that would have been used to generate the corresponding IPv6 Charging Data Record.

The invention also discloses a charging node arranged to receive CDRs for a user from a CDR generating node in its own HPLMN according to IPv6, and to receive IPv4 CDRs for the same user generated by the CDR generating node mentioned above, i.e. the CDR generating node in a VPLMN which generates IPv4 CDRs instead of IPv6 CDRs. The charging node is arranged to verify the received IPv4 CDRs by means of comparing one or more Information Elements in the CDRs received from the CDR generating node in the VPLMN with the corresponding one or more Information Elements in the CDRs from the CDR generating node in its own HPLMN.

Examples of suitable Information Elements for such comparison in the CDRs received from the HPLMN include one or more of the following: p-GWAddress, p-GWAddressUsed, ggsnAddressUsed, servingNodeAddress, each in combination with the Information Element chargingID.

Examples of suitable Information Elements for such comparison in the CDRs received from the VPLMN include one or more of the following: p-GWAddress, p-GWAddressUsed, ggsnAddressUsed, servingNodeAddress, s-GWAddress or sgsnAddress, each in combination with the Information Element chargingID.

The CDR generating nodes of the invention are suitably one of the following 3GPPP nodes: a Gateway GPRS Support Node, a Serving GPRS Support Node, a Packet Data Gateway or a Serving Gateway.

BRIEF DESCRIPTION OF THE DRAWINGS

The invention will be described in more detail in the following, with reference to the appended drawings, in which FIG. 1 shows an overview of a system in which the invention is applied.

DETAILED DESCRIPTION

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows an example of a system 100 in which the invention is applied. The system 100 can, for example, be a cellular access system such as a 3GPPP system, or a cellular access system of another type, such as, for example CDMA2000

In the system 100, there is shown a User Equipment, a UE 112, which roams, i.e. it is located in a network other than that of its own operator. The visited network is shown as a VPLMN 105, Visited Public Land Mobile Network, and the home network of the UE 112 is shown as HPLMN 125, Home Public Land Mobile Network.

The traffic of the UE 112 is kept track of by the VPLMN 105, and in order to bill the UE's HPLMN 125 for the traffic of the UE 112, a node in the VPLMN 105 generates so called CDRs, Charging Data Records. The node in the VPLMN 105 which generates the CDRs is here referred to as a CDR generating node, and in the example of FIG. 1 also handles the user plane of the UE's connection to a PDN 140 via the VPLMN 105. As an example only, the CDR generating node in the VPLMN 105 is in FIG. 1 shown as a Serving GPRS Support Node, SGSN 110. The CDR generating node in the VPLMN can also, for example, be such nodes as a Gateway GPRS Support Node, GGSN, or a Packet Data Gateway, PGW or a Serving Gateway, SGW. The CDRs generated in the VPLMN 105 are sent to the HPLMN 125 from a charging node 115 in the VPLMN, and are received by a charging node 130 in the HPLMN 125. As shown in FIG. 1, the HPLMN 125 also comprises a CDR generating node, here shown as a GGSN 135. As indicated in FIG. 1, the UE's traffic to its HPLMN 125 (and to the PDN 140) is according to the so called IPv6 protocol.

The UE 112 is shown as being connected to the SGSN 110, although with dashed lines, in order to indicate that there are other, not shown, nodes between the UE 112 and the SGSN 110.

CDRs can be generated in different formats, and if the CDRs which are generated by the SGSN 110 in the VPLMN 105 are in a format which cannot be understood by the Charging system or node 115 in the VPLMN, the CDRs will be disapproved of by the VPLMN's charging system or node 115, and the VPLMN's revenue as well as the HPLMN's revenue from the traffic of the UE 112 during its roaming in the VPLMN 105 will thus be lost.

One example of a CDR format which may not be possible to understand by the charging system or node 115 in the VPLMN 105 is CDRs formatted as specified in the Internet Protocol version 6, abbreviated as IPv6. If the VPLMN charging system or node 115 is arranged to handle IPv4 CDRs, and the VPLMN's CDR generating node SGSGN 110 generates CDRs for the UE 112 in IPv6 since the UE's traffic is IPv6, the VPLMN accounting node 115 will not be able to understand the received CDRs, resulting in loss of revenue In order to address this problem, i.e. CDRs in IPv6 format for a UE's IPv6 traffic sent to a VPLMN charging node or system which is only capable of IPv4, the invention discloses a CDR generating node which is arranged to generate IPv4 CDRs for IPv6 traffic. A node of the invention will be described below with reference to the SGSN 110 of FIG. 1, although, as pointed out, a CDR generating node of the invention can also be other (not shown) nodes in the VPLMN 105.

The IPv4 CDRs generated by the SGSN 110 are either a result of a translation of an already generated IPv6 CDR or they are directly generated from the same data that would be collected for an IPv6 CDR generating mechanism SGSN 110. The IPv4 address contained in the generated IPA CDR can in various embodiments of the CDR generating node 112 be associated with the correct IPv6 address by means of using selected bits from the IPv6 address for the entire IPv4 address or by means of using parts of the IPv6 address for parts of the IPv4 address. The IPv4 address contained in the generated IPv4 CDR can also be selected independent of the IPv6 address from the full range of the available 32 bits. Three various embodiments will be described in the following; which of the embodiments that is used may be based on a system operator's preferences.

In a CDR generating node of the invention, the IPv6 Information Element, IE, "pdpType" of the data type "PDPType OPTIONAL" is altered from F157'H to F121'H, in order to translate the IE from IPv6 to IPv4. Alternatively, in IPv6 systems such as EPC (Evolved Packet Core) it is the IE pdpPDNType of the data type PDPTypeOPTIONAL which is altered from F157'H to F121'H, in order to translate the IE from IPv6 to IPv4.

In addition to altering the IE pdpType or pdpPDNType, one more IE is changed in order to obtain an IPv4 CDR instead of an IPv6 CDR. This IE is the IE "servedPDPAddress" of the data type "PDPAddress OPTIONAL" or (for EPC system) the Information Element "servedPDPPDNAddress" of the data type "PDPAddress OPTIONAL".

In one embodiment of the CDR generating node of the invention, the IE servedPDPAddress or servedPDPPDNAddress is changed from the original CDR IPv6 address to the IPv4 address 0.0.0.0, which is a possible value indicating a dynamic IPv4 not yet known by the CDR generating node. This is a valid and well-known IPv4 address in CDRs.

An example of this embodiment is as follows:
The following IEs are changed from:

```
pdpType                                              F157 'H
  servedPDPAddress
    iPAddress
      iPBinV6Address 20011B708140FF01E247A360E8883052 'H
``` into;

```
        pdpType                                      F121 'H
          servedPDPAddress
            iPAddress
              iPBinV4Address 00000000 'H
```

In another embodiment of the CDR generating node of the invention, the IE "servedPDPAddress" or "servedPDPPDNAddress" is changed from the original CDR IPv6 address to a (32 bit) IPv4 address by copying selected bits from the IPv6 address to the IPv4 address which is to be used. In one embodiment, this is done by copying the lower 32 bit of the 64 bit (usually indicated as /64) IPv6 prefix assigned to the UE into the IE servedPDPAddress or the IE servedPDPPDNAddress.

An example of this is as follows:
The following IEs are changed from:

```
pdpType                                              F157 'H
  servedPDPAddress
    iPAddress
      iPBinV6Address 20011B708140FF01E247A360E8883052 'H
``` into:

```
        pdpType                                      F121 'H
          servedPDPAddress
            iPAddress
              iPBinV4Address 8140FF01 'H
```

The copied bits are underlined in the IPv6 format above, in order to facilitate for the reader.

In another embodiment of the CDR generating node of the invention in which the IE "servedPDPAddress" or "servedPDPPDNAddress" is changed from the original CDR IPv6 address to a (32 bit) IPv4 address by copying selected bits from the IPv6 address to the IPv4 address which is to be used, and the generated IPv4 address is then labeled by replacing some of the bits with certain predefined bits to indicate that a change of PDPType has taken place for the current CDR.

A possible embodiment of this is to replace the four most significant bits of the 32 bit IPv4 address into "1111" which changes the IPv4 address to an address in the reserved 240/4 address range (formerly known as Class E IPv4 address range) which is currently not to be used as host addresses or multicast addresses. The modified IPv4 address is used as the generated IPv4 CDR IE servedPDPAddress or servedPDPPDNAddress. By this arrangement, a translation, i.e. a conversion of a CDR from IPv6 into IPv4, can be identified by inspecting the translated CDR IPv4 address.

An example of such an embodiment is as follows:
The following information elements are changed from:

```
pdpType                                              F157 'H
  servedPDPAddress
    iPAddress
      iPBinV6Address 20011B708140FF01E247A360E8883052 'H
``` to become:

```
        pdpType                                      F121 'H
          servedPDPAddress
            iPAddress
              iPBinV4Address F140FF01 'H
```

The affected hex digits are underlined above, for the reader's ease.

As shown in FIG. 1, the IPv6 traffic for the UE 112 to the PDN 140 also passes through the UE's HPLMN 125, in this case via the GGSN 135. In order to enable the HPLMN to verify the CDRs received from the VPLMN 105, the GGSN 135 generates its own CDRs for the traffic of the UE 112, in IPv6 format, and sends those CDRs to a charging node 130 in the HPLMN.

The charging node 130 is arranged to receive Charging Data Records, CDRs, according to IPv6 for the UE 112 from the CDR generating node, the GGSN 135, in its own HPLMN 125, and is also arranged to receive IPv4 CDRs for the UE 112 from the VPLMN 105 generated by the CDR generating node 110 which has been described above.

In addition, the Charging node 130 is arranged to verify the received IPv4 Charging Data Records from the VPLMN 105 by means of comparing one or more Information Elements in the received IPv4 Charging Data Records with the corresponding one or more Information Elements in the IPv6 CDRs received from the CDR generating node 135 in its own HPLMN 125.

This is done by means of comparing one or more other IEs than those which are modified by the VPLMN's CDR generating node 110, i.e. IEs which are left "untouched" by the modification of IPv6 CDRs into IPv4 CDRs, and which can thus be compared with the IPv6 CDRs which are generated by the HPLMNs CDR generating node 135.

Examples of IEs from CDRs in the HPLMN which can be used for this purpose by the HPLMN's CDR generating node 135 include one or more of the following IEs: p-GWAddress, p-GWAddressUsed, ggsnAddressUsed, servingNodeAddress, each in combination with the Information Element chargingID, which will give a 1:1 match between the CDRs from the VPLMN and the CDRs generated in the HPLMN.

Alternatively, the HPLMN's charging node 130 can be arranged to choose the Information Elements it compares with the IEs in the CDRs received from the VPLMN 105 from one of the following IEs: IMSI, MSISDN, IMEI, SGSNaddress, and APN.

In one embodiment, the charging node 130 is arranged to choose the Information Elements in the CDRs received from the VPLMN for comparison from one of the following: p-GWAddress, p-GWAddressUsed, ggsnAddressUsed, servingNodeAddress, s-GWAddress or sgsnAddress, each in combination with the Information Element chargingID.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention, Accordingly, although specific terms are employed, they are used in a generic and descriptive sense only and not for purposes of limitation.

The invention is not limited to the examples of embodiments described above and shown in the drawings, but may be freely varied within the scope of the appended claims.

| | |
|---|---|
| 3GPP | 3rd Generation Partnership Project |
| APN | Access Point Name |
| ASN.1 | Abstract Syntax Notation One |
| BD | Billing Domain |
| CS | Circuit Switched |
| CDF | Charging Data Function |
| CDR | Charging Data Record |
| EPC | Evolved Packet Core |
| EPS | Evolved Packet System |
| GPRS | General Packet Radio Service |
| HPLMN | Home Public Land Mobile Network |
| IMEI | International Mobile Equipment Identity |
| IMSI | International Mobile Subscriber Identity |
| IP | Internet Protocol |
| IPv4 | Internet Protocol version 4 |
| IPv6 | Internet Protocol version 6 |
| MSISDN | Mobile Subscriber ISDN Number |
| PDN | Packet Data Network |
| PDP | Packet Data Protocol |
| PLMN | Public Land Mobile Network |
| PS | Packet Switched |
| SGSN | Serving GPRS Support Node |
| S-GW | Serving Gateway |
| TAP | Transferred Account Procedure |

-continued

| | |
|---|---|
| TR | Technical Report |
| TS | Technical Specification |
| VPLMN | Visited Public Land Mobile Network |

The invention claimed is:

1. A Charging Data Record, CDR, generating node (110) for a cellular access system (100), the CDR generating node (110) being characterized in that it is arranged to generate CDRs for Internet Protocol version 6, IPv6, traffic in the CDR format for IPv4 traffic instead of in the CDR format for IPv6 traffic, the Charging Data Record generating node (110) being arranged to generate IPv4 CDRs for IPv6 traffic instead of IPv6 CDRs by changing one of an Information Element "pdpType" and an Information Element "pdpPDNType" from F157'H to F121'H, and by changing one of an Information Element "served PDPaddress" and an Information Element "servedPDPPDNAddress" from an IPv6 format to an IPv4 format.

2. The Charging Data Record generating node (110) of claim 1, being arranged to change the Information Element "servedPDPaddress" from an IPv6 format to an IPv4 format by changing the Information Element "servedPDPaddress" from the Charging Data Record's IPv6 address to the IPv4 address 0.0.0.0.

3. The Charging Data Record generating node (110) of claim 2, being arranged to first generate an IPv6 Charging Data Record, and to then alter the IPv6 Charging Data Record into an IPv4 Charging Data Record.

4. The Charging Data Record generating node (110) of claim 2, being arranged to generate an IPv4 Charging Data Record by generating the IPv4 Charging Data Record directly from the data that would have been used to generate the corresponding IPv6 Charging Data Record.

5. The Charging Data Record generating node (110) of claim 1, being arranged to change the Information Element "servedPDPaddress" from an IPv6 format to an IPv4 format by copying selected bits from the IPv6 address to the IPv4 address which is to be used.

6. The Charging Data Record generating node (110) of claim 5, being arranged to copy the lower 32 bit of the 64 bit IPv6 prefix assigned to the MS/UE into the IPv4 "servedPDPaddress" or "servedPDPPDNAddress" which is to be used.

7. The Charging Data Record generating node (110) of claim 6, being arranged to label the generated IPv4 address by replacing certain predefined bits with other predefined bits, in order to indicate that a change of an Information Element of the type PDPType has taken place in the Charging Data Record.

8. The Charging Data Record generating node (110) of claim 7, being arranged to replace the four most significant bits of the IPv4 address to "1111", and to use the modified IPv4 address as one of the servedPDPAddress and the "servedPDPPDNAddress" of the generated IPv4 Charging Data Record.

9. The Charging Data Record generating node (110) of claim 5, being arranged to label the generated IPv4 address by replacing certain predefined bits with other predefined bits, in order to indicate that a change of an Information Element of the type PDPType has taken place in the Charging Data Record.

10. The Charging Data Record generating node (110) of claim 9, being arranged to replace the four most significant bits of the IPv4 address to "1111", and to use the modified IPv4 address as one of the servedPDPAddress and the "servedPDPPDNAddress" of the generated IPv4 Charging Data Record.

11. The Charging Data Record generating node (110) of claim 5, being arranged to first generate an IPv6 Charging Data Record, and to then alter the IPv6 Charging Data Record into an IPv4 Charging Data Record.

12. The Charging Data Record generating node (110) of claim 3, being arranged to generate an IPv4 Charging Data Record by generating the IPv4 Charging Data Record directly from the data that would have been used to generate the corresponding IPv6 Charging Data Record.

13. The Charging Data Record generating node (110) of claim 1, being arranged to first generate an IPv6 Charging Data Record, and to then alter the IPv6 Charging Data Record into an IPv4 Charging Data Record.

14. The Charging Data Record generating node (110) of claim 1, being arranged to generate an IPv4 Charging Data Record by generating the IPv4 Charging Data Record directly from the data that would have been used to generate the corresponding IPv6 Charging Data Record.

15. A Charging node (130) arranged to receive Charging Data Records, CDRs, according to IPv6 for a first User or Users from a CDR generating node (135) in its own HPLMN (125), the Charging node (130) being characterized in that it is arranged to receive IPv4 CDRs from a VPLMN (105) generated by a CDR generating node (110) for said first User or Users, the Charging node (130) being arranged to verify the received IPv4 CDRs by comparing one or more Information Element in the CDRs received from the CDR generating node in the VPLMN with the corresponding one or more Information Elements in the CDRs received from the CDR generating node (135) in its own HPLMN (125).

16. The Charging node (130) of claim 15, being arranged to choose the one or more Information Elements in the CDRs received from the HPLMN for comparison from one of the following: p-GWAddress, p-GWAddressUsed, ggsnAddressUsed, servingNodeAddress, each in combination with the Information Element chargingID.

17. The Charging Node (130) of claim 16, being arranged to choose the one or more Information Elements in the CDRs received from the VPLMN for comparison from one of a p-GWAddress, a p-GWAddressUsed, a ggsnAddressUsed, a servingNodeAddress, an s-GWAddress and an sgsnAddress, each in combination with the Information Element chargingID.

18. The Charging node (130) of claim 17, being arranged to choose the Information Elements compared from the group consisting of: IMSI, MSISDN, IMEI, SGSNaddress, and APN.

19. The Charging node (130) of claim 16, being arranged to choose the Information Elements compared from the group consisting of: IMSI, MSISDN, IMEI, SGSNaddress, and APN.

20. The Charging node (130) of any of claim 16, wherein the Charging node (130) is a 3GPPP node selected from the group consisting of a Gateway GPRS Support Node, a Serving GPRS Support Node, a Packet Data Gateway and a Serving Gateway.

* * * * *